(12) United States Patent
Blaurock et al.

(10) Patent No.: US 6,321,614 B1
(45) Date of Patent: Nov. 27, 2001

(54) SCREW DRIVE WITH ROLLING ELEMENTS, AND METHOD OF ASSEMBLY

(75) Inventors: Werner Blaurock, Niederwerrn; Roland Greubel, Ramsthal; Hugo Och, Rottendorf; Peter Blattner, Dingolshausen, all of (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 09/473,493

(22) Filed: Dec. 28, 1999

(30) Foreign Application Priority Data

Dec. 29, 1998 (DE) ............................. 198 60 643

(51) Int. Cl.$^7$ .......................... F16H 25/22; F16H 57/12
(52) U.S. Cl. ............................. 74/441; 411/433
(58) Field of Search ........................... 74/441; 411/432, 411/433

(56) References Cited

U.S. PATENT DOCUMENTS

| | | | |
|---|---|---|---|
| 4,364,136 | * 12/1982 | Hattan | 470/21 |
| 4,802,805 | * 2/1989 | Hattan | 411/432 X |
| 6,163,011 | * 12/2000 | Urushizaki et al. | 219/121.64 |

FOREIGN PATENT DOCUMENTS

| | | |
|---|---|---|
| 2135812 | 1/1973 | (DE) . |
| 2349958 | 4/1974 | (DE) . |
| 2453635 | 5/1975 | (DE) . |
| 2533996 | 2/1977 | (DE) . |
| 7708184 | 7/1977 | (DE) . |
| 2940762 | 4/1981 | (DE) . |
| 3038774 | 7/1982 | (DE) . |
| 3207566 | 9/1983 | (DE) . |
| 3700693 | 7/1988 | (DE) . |
| 4208126 | 9/1992 | (DE) . |
| 0049903 | 1/1985 | (EP) . |
| 60-220256 | * 11/1985 | (JP) . |
| 61-65958 | * 4/1986 | (JP) . |

* cited by examiner

*Primary Examiner*—Allan D. Herrmann
(74) *Attorney, Agent, or Firm*—Baker Botts L.L.P.

(57) ABSTRACT

A screw drive (10a) with rolling elements, optionally a ball screw drive, includes a screw spindle with a spindle axis (S) and a double nut (14a) running on the screw spindle, with two separately formed single nuts (16a, 18a) which are substantially rigidly joined in the direction of the axis (S) of the spindle. In order to set a desired play or bias relative to the screw spindle, the two single nuts (16a, 18a) can be turned continuously about the axis (S) of the spindle relative to each other and fixed in any relative rotary position corresponding to the desired play or bias. According to the invention, a first of the two single nuts or an intermediate element (28a) joined thereto and arranged between the two single nuts, as a first alternative, is welded to one of the two single nuts or to at least one part (42a) joined thereto or, as a second alternative, has at least one peripheral section pressed into an associated aperture in one of the single nuts.

15 Claims, 7 Drawing Sheets

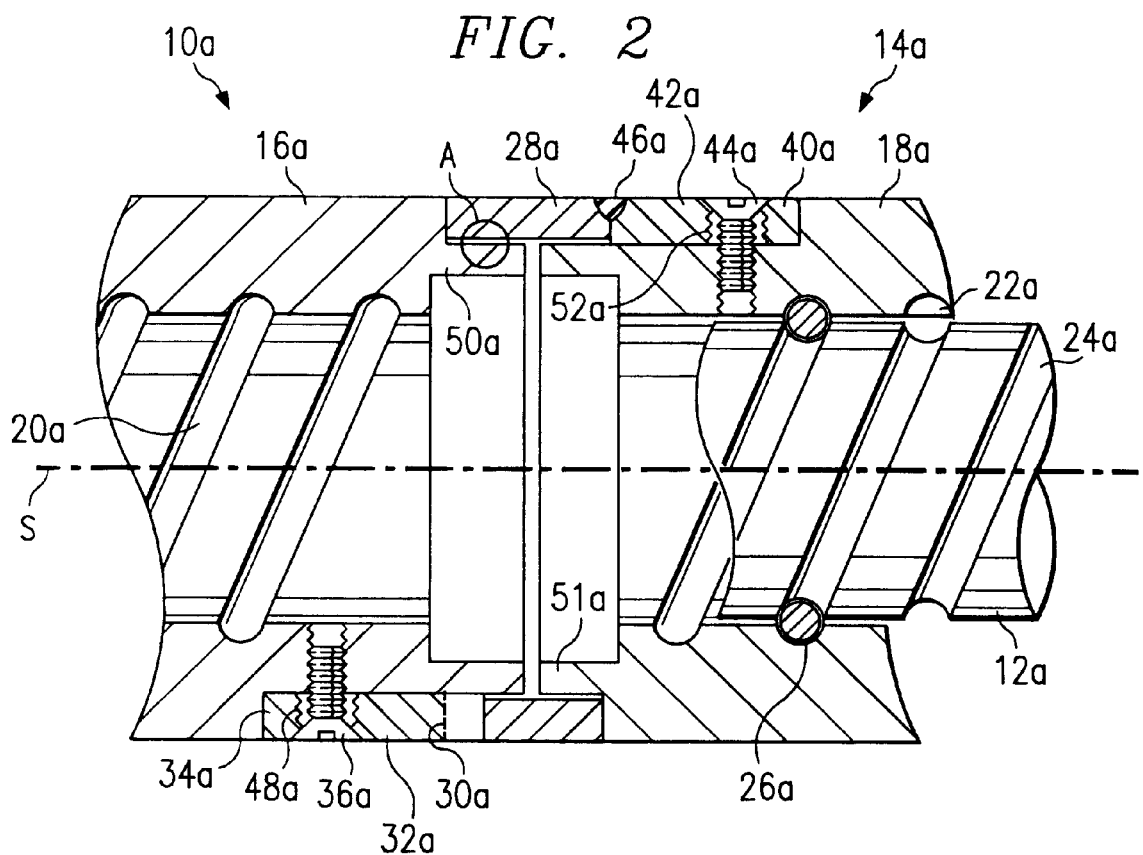
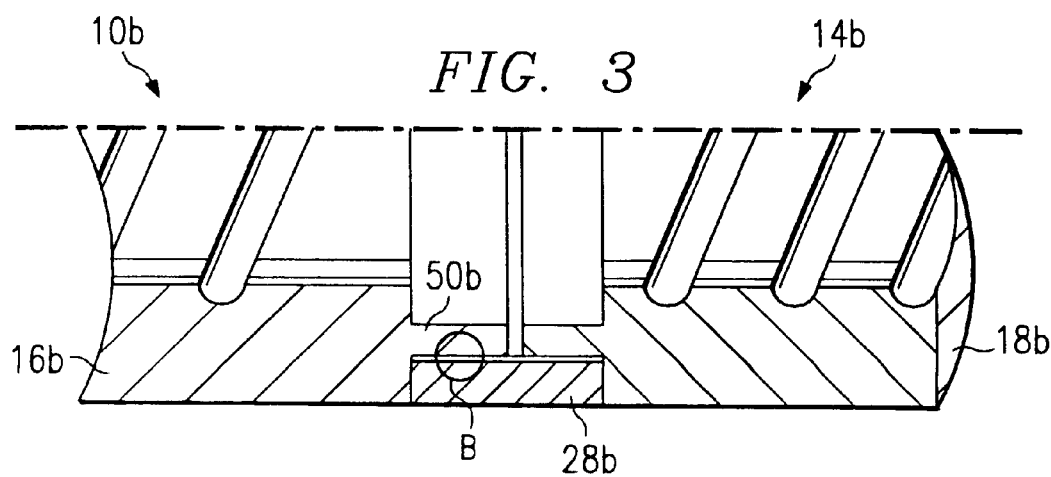

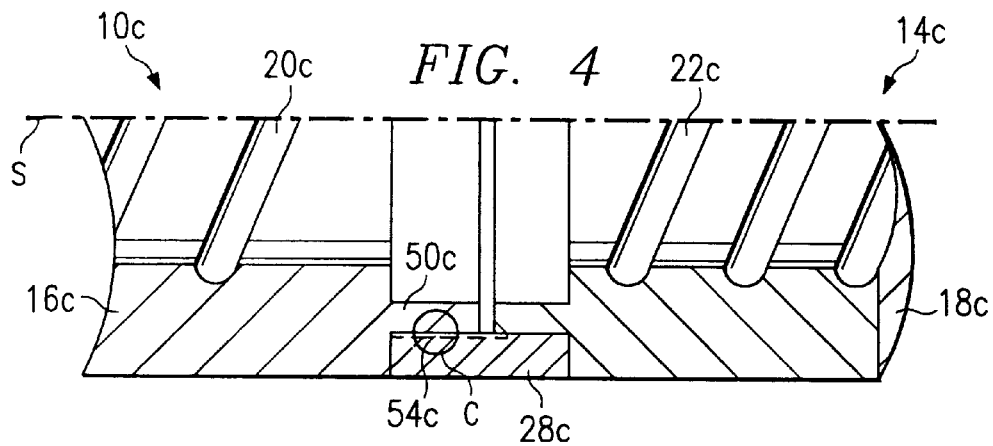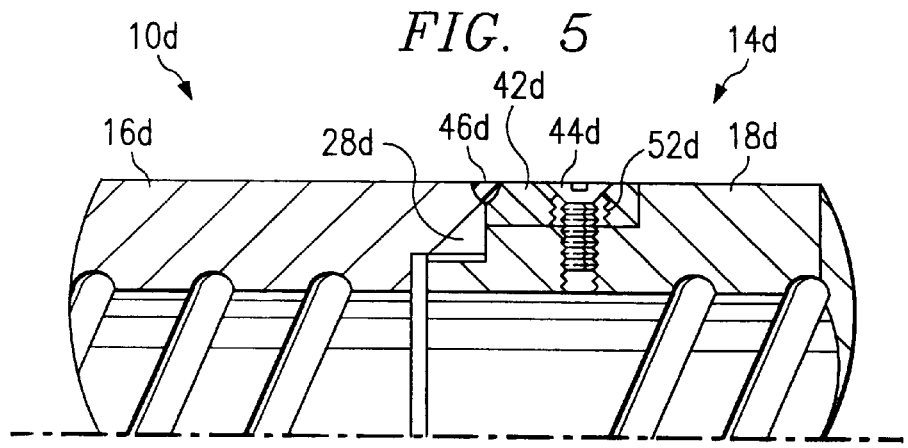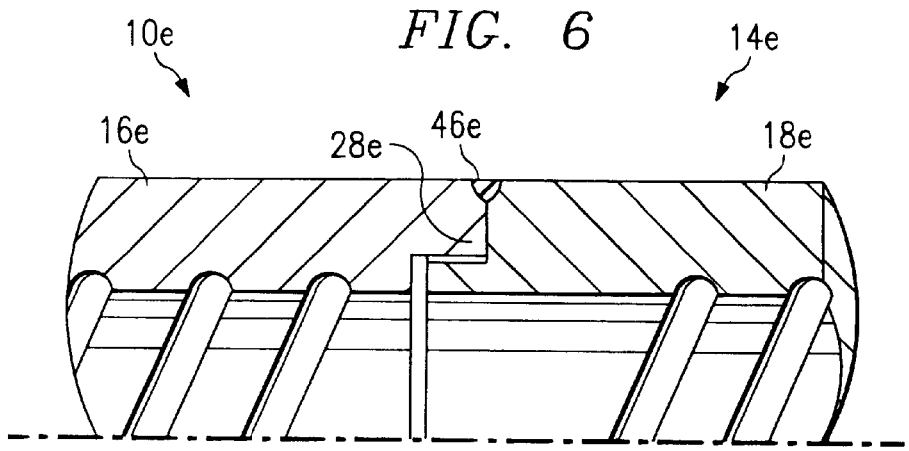

SCREW DRIVE WITH ROLLING ELEMENTS, AND METHOD OF ASSEMBLY

BACKGROUND OF THE INVENTION

1. Field of the Invention

The invention relates to a screw drive with rolling elements and, more particularly, to a ball screw drive including a screw spindle with a spindle axis and a double nut running on the screw spindle with two separately formed single nuts which are substantially rigidly joined in the direction of the axis of the spindle. In order to set a desired play or bias relative to the screw spindle, the two single nuts can be turned continuously about the axis of the spindle relative to each other and fixed in any relative rotary position corresponding to the desired play or bias.

2. The Prior Art

Screw drives of the foregoing type are used, for example, for rapid and accurate positioning of tool and work holders and for moving them at defined speeds. Rotary motion of the screw spindle is converted to linear motion of the guided double nut. In order to satisfy the highest possible demands for accuracy in reversing the direction of motion of the double nut, the double nut has to be arranged on the spindle as far as possible without play. For this purpose, when the two nuts are being mounted on the spindle they are turned towards each other far enough to make their facing end surfaces bear against each other. Further turning of the nuts causes the rolling elements to be applied to opposing side surfaces of the raceways of the nuts, which ultimately results in the desired biasing of the two nuts relative to the screw spindle and guidance of the double nut on the spindle substantially without play.

A screw drive of the above type, i.e., a screw drive in which the play or bias of the two single nuts relative to the screw spindle can be infinitely adjusted, is known, for example, from DE-OS 21 35 812. A screw bolt is contained in an intermediate element of the known screw drive which is non-rotatably joined to one of the single nuts, the screw bolt being in screw engagement with a part mounted non-rotatably on the other single nut. The worm drive thus formed allows infinitely variable turning of the two single nuts relative to each other about the axis of the spindle. One disadvantage of this construction is that a relatively large amount of space has to be provided for the worm drive, particularly in a radial direction. Another disadvantage is that, in spite of the self-locking inherent in worm drives, the desired bias set may undesirably re-adjust itself, for example, due to vibrations, causing the screw bolt of the worm drive to turn.

A similarly constructed screw drive is known from DE-OS 23 49 958.

Versions of the generic screw drive are known from DE-OS 23 49 958 and from DE 30 38 774 C2 and the corresponding EP 0 049 903 B1 in which an intermediate element is in frictional engagement with both single nuts in order to prevent relative rotation between them. The frictional forces must therefore be overcome during the assembly, i.e., the relative turning of the two single nuts to set the desired bias or play. This makes exact setting of the play or bias to the desired value considerably more difficult.

Screw drives are further known from DE 24 53 635 C3, DE-OS 25 33 996 and DE 29 40 762 C2 in which the two single nuts can only be turned relative to each other and fixed in predetermined angular steps rather than infinitely variably.

In the screw drive known from German utility model 77 08 184, infinitely variable turning of the two single nuts is only possible within a very narrow angular range. In order to set a desired bias or play relative to the screw spindle, it is therefore also necessary to provide spacers between the two nuts, and their thickness must be determined by the desired bias or play. Hence, even with experienced operators it is usually necessary to change the spacers several times during assembly, until the spacer with the right thickness for the desired bias or play has been found. Assembly of the screw drive known from DE-GM 77 08 184 is therefore laborious and time consuming.

In DE 39 00 693 C2, a cavity formed by annular grooves and indentations between the two touching end faces of the single nuts is filled with casting compound to form the intermediate element. The position of relative rotation of the two single nuts corresponding to the desired bias or play must therefore be maintained until the casting compound has completely hardened.

A screw drive where the two single nuts are joined by an intermediate element which yields resiliently in the direction of the axis of the spindle is known from DE 42 08 126 A1. An axially resilient arrangement of this type has the drawback that, when a force exceeding the spring force is exerted on one of the single nuts, the two single nuts may move towards each other, thereby losing the desired bias.

In DE 32 07 566 A1, after the desired bias of the two single nuts has been set, a hole to receive a radial locking bolt is formed in their common contact region, to ensure that the bias obtained is maintained.

An object of the invention, therefore is to provide a screw of the abovementioned type which, with a simple construction and simple assembly, readily enables the play or bias of the single nuts relative to the screw spindle to be adjusted accurately and infinitely variably to a desired value.

According to the invention, the foregoing object is attained by the provision of a screw drive of the above type, in which either a first of the two single nuts or an intermediate element joined thereto and arranged between the two single nuts is welded to the second single nut or to at least one part joined thereto, or a first of the two single nuts or an intermediate element joined thereto and arranged between the two single nuts has at least one peripheral section pressed into an associated aperture in the second single nut. In accordance with the invention, the non-rotational joining of the first single nut or the intermediate element to the second single nut is the last operation in assembling the screw drive according to the invention. The possibly necessary non-rotational joining of the intermediate element to the first single nut or the formation of the intermediate element on the first single nut may take place in a preceding operation or simultaneously with the non-rotational joining of the intermediate element to the second single nut.

The limit between direct joining of the two single nuts and joining an intermediate element integral with one of them to the other single nut is a fluid transition in practice. It is not always possible to decide which of the two extreme cases applies. Basically any part of the single nut used for joining the other single nut may be considered as an intermediate element, even when that intermediate element is not a separately formed part of the single nut in question.

In order to join the two single nuts or the intermediate element non-rotatably to the second single nut, the latter is first brought into contact with the first single nut or the intermediate element by turning on the screw spindle. The desired play or bias of the two single nuts relative to the screw spindle is then set by further turning of the nuts. The only frictional forces arising between the intermediate element and the nut emanate from the actual bias. When the play or bias has reached the desired value, then as a first alternative the first single nut or the intermediate element is welded to the second single nut or to a part joined thereto, or as a second alternative a peripheral section of the first single nut or of the intermediate element is pressed into an associated aperture in the second single nut. In both cases, a secure, non-rotational joint is obtained, allowing immediate further processing of the screw drive. And in both cases subsequent accidental turning of the two single nuts relative to each other, with resultant re-adjustment of the desired play or bias, is reliably avoided.

The use of weld connections in the screw drive according to the invention and in the method of the invention will be described in detail at a later stage.

To enable the first single nut or the intermediate element to be separated from the second single nut, the first single nut or the intermediate element may be welded to at least one fit component which is detachably fixed to the second single nut, for example being screwed to it by means of a screw bolt. When the screw bolt has been released, the fit component may, for example, be levered off the second single nut with a tool, thus breaking the weld between the fit component and the first single nut or intermediate element. When the broken location has been smoothed, the single nuts and intermediate element can be re-used without any problems and re-welded to another fit component when the play or bias has been set to the desired value. Alternatively, the double nut may be transferred to an auxiliary spindle with a smooth surface, i.e., an auxiliary spindle without a helically extending raceway. When the screw bolt has been released, the second single nut can be pulled off the fit component welded to the first single nut or the intermediate element in an axial direction on the smooth auxiliary spindle without the weld having to be broken.

To facilitate the above-mentioned levering of the fit component off the second single nut, the inside diameter of the hole passing through the fit component may be larger than the outside diameter of the screw bolt, and the hole passing through the fit component may be provided with an internal screw thread. In that case, a screw bolt with an outside diameter larger than that of the screw bolt used for fixing the fit component to the second single nut may be driven into the threaded hole. As this "release bolt" is screwed further and further into the hole it levers the fit component off the second single nut. This process takes place in an extremely controlled manner owing to the strong transmission action emanating from the thread. This is advantageous particularly when the fit component lies substantially flush against the first single nut or the intermediate element along a predetermined distance, and is preferably welded to the first single nut or the intermediate element along that entire distance.

Alternatively to welding to a fit component, it is also possible for the first single nut or the intermediate element to be welded to the second single nut along at least part of—preferably along substantially the whole of—the contact line, visible from the outside, between those components. In that case, however, it is not possible to dismantle the first single nut or the intermediate element from the second single nut without breaking them. Yet this embodiment is particularly suitable for applications with a low risk of damage, owing to the small number of parts and the consequent opportunity for cost-effective production and assembly.

In another alternative embodiment, the peripheral section may be pressed into the aperture in the second single nut in an axial or/and radial direction. It is then advantageous for the peripheral section which is pressed in to bear on the wall surfaces bounding the aperture only in a peripheral direction. In this way, one can reliably avoid forces acting in either an axial or a radial direction that might influence the bias or play of the two single nuts relative to the screw spindle.

In order to reduce the impressing forces required or/and to enable the peripheral section pressed in to be applied to the side walls of the aperture over the largest possible area, provision may further be made for the peripheral section which is pressed in to be indented.

To increase the stability of the whole arrangement and thus reduce the risk of deformation of the nuts, particularly in their end regions facing towards each other, the aperture may be bounded radially inwardly by a wall section of the second single nut.

In certain applications it may be advantageous for the first single nut or the intermediate element to be additionally adhered to the second single nut, preferably using a double-sided adhesive tape. Adhesive tapes with curing synthetic resins suitable for this application are obtainable, for example, under the name of SCOTCH™ VHB™.

Also, the second single nut may clearly be joined to the first single nut or the intermediate element by means of a plurality of fit components welded to the first single nut or intermediate element, or a plurality of sections of the first single nut or intermediate element pressed into apertures in the second single nut may be spread over the whole periphery.

As already indicated above, there are various possible ways of joining the intermediate element to the first single nut. Thus, the intermediate element may both be integral with the first single nut and an element separate from that nut. In the first case, a particularly stable non-rotational connection is obtained between the intermediate element and the first single nut, although it makes it difficult to dismantle the double nut of the screw drive on the screw spindle without breaking it.

In cases where the intermediate element is a separate element, there are again various ways of fixing it non-rotatably to the first single nut:

For example, the intermediate element may be joined to the first single nut with a press fit. Additionally or alternatively, the intermediate element may be adhered to the first single nut, preferably using a double-sided adhesive tape, as already mentioned for joining the intermediate element to the second single nut.

To obtain a positive connection between the intermediate element and the first single nut, the intermediate element may be held non-rotatably relative to the first single nut by at least one additional fit component, which is joined to or integral with one of the two components, i.e., the intermediate element or the first single nut, and which in either case engages in an aperture provided in the other component, the first single nut or the intermediate element.

In a first alternative form of the positive connection, the additional fit component may be formed by a peripheral section of the intermediate element which is pressed into an aperture in the first single nut. In a second alternative form, it is also possible for the additional fit component to be a separate component and to be fixed detachably to the first single nut, for example, by being screwed onto it by means of a screw bolt. The advantages of these two alternative joining methods may be seen from the above discussion of the various ways of joining the intermediate element to the second single nut. In particular, if an additional fit component which can be screwed onto the first single nut is used, it is then possible for the inside diameter of the hole passing through the additional fit component to be larger than the outside diameter of the screw bolt, and for the hole to be provided with an internal screw thread.

Another possible way of joining the first single nut to the intermediate element is to have a plurality of additional fit components distributed around the whole periphery.

Another method of joining the intermediate element to the first single nut is to screw it onto or into the nut, for example, by means of a fine thread. The decisive factor in making the joint between the intermediate element and the first single nut non-rotational in operation is that the pitch and/or rotary direction of the screw connection between them should be different from those of the screw spindle.

Finally, it is also possible for the intermediate element to be welded to the first single nut along at least part of—and preferably along substantially the whole of—the contact line, visible from the outside, between the two components.

To facilitate reproducible and accurate assembly of the screw drive according to the invention it is proposed, in a further embodiment, that the intermediate element on at least one of the single nuts, and preferably both single nuts, be arranged centered in respect of the axis of the spindle, or that the two single nuts be arranged centered relative to each other in respect of the axis of the spindle.

To increase the stability of the screw drive but also to ensure high-precision manufacture, it is further proposed that the intermediate element should be formed by a closed ring member.

To obtain a screw drive according to the invention which can be produced at a favorable cost, it is also possible for the intermediate element to be formed by a slotted ring member, which may, for example, be formed by a sheet metal strip bent into a ring shape. The two end regions of the metal strip adjoining the slot may be fixed to at least one of the two single nuts by welding, in order to obtain a ring member which is substantially rigid in operation. The slotted ring member may be fixed cost-effectively to at least one of the two single nuts, e.g., by spot welding. It is preferable for the slot in the intermediate element to be closed by welding.

To allow a certain amount of tolerance adjustment, the intermediate element may have an elastic region which allows the two single nuts to tilt relative to each other about axes substantially perpendicular to the axis of the spindle, while joining the two single nuts substantially rigidly in an axial direction, i.e., particularly an elastic region which to a limited extent allows only swivelling movements of the two single nuts relative to each other about axes extending perpendicular to the axis of the spindle.

Further according to the invention, at least one of two components to be joined, i.e., the first single nut or intermediate element, or the second single nut or intermediate element, or one of the two single nuts, may be made of soft, i.e., non-hardened, steel at least in a region determined for joining to the respective other component. These soft regions may also be treated in a simple manner by the end user. For example, tapped holes may be made in these soft regions with ordinary commercial tools, allowing highly flexible installation of screw drives according to the invention in higher-level structures. Moreover, the soft regions of one component may be pressed into associated apertures in the other, to join the two components.

Particularly in view of the above-mentioned possibility of joining the components of the screw drive according to the invention by welding, the soft regions may be made of a weldable steel, for example, a steel with a low carbon content. It has hitherto been assumed in the state of the art that for two components of a screw drive to be welded together both components had to be made of a steel with a low carbon content. However, appropriate tests carried out by applicants have shown that a weld connection of satisfactory quality can be obtained even if only one of the two components is made of a steel with a low carbon content, while the other is made of a steel with a high carbon content. For example, the intermediate element may be made of a steel with a low carbon content while the two single nuts are made of a hard steel with a high carbon content.

This realization is advantageous particularly because in many cases it makes it possible to avoid the use of case-hardened single nuts, i.e., single nuts in which the rolling element raceway is hardened by carburisation—and thus has a high carbon content—and is surrounded by an outer surface region made of a softer steel with a low carbon content. With the above construction, the production of case-hardened nuts requires a relatively large outlay and is thus expensive. For the reasons explained above, it is an independent feature of the invention that two components of a screw drive may be welded together in which only one is made of a steel with a low carbon content.

The use of case-hardened single nuts is nevertheless not excluded. The provision of at least one case-hardened single nut may be appropriate, e.g., when the intermediate element is integral with one of the two single nuts and the nut is to be joined to the other single nut by welding or pressing in. In a case-hardened single nut for this purpose, the region to be welded or pressed in is not carburised. Apart from case-hardening, the spindle raceways of the single nuts may also be induction hardened. This method, in which the steel to be hardened is merely induction heated instead of having carbon supplied to it, is particularly suitable for use in single nuts made entirely of carbon-rich steel. Owing to the high carbon content of the outer surface region surrounding the spindle raceway, induction hardened single nuts cannot be welded directly together. However, the outer surface region remains soft in the induction hardening process, so the single nuts can be joined by the pressing-in method described above.

Laser welding processes, for example, are suitable to form the weld connection. One advantage of such processes is that no material has to be supplied externally during welding, e.g., in the form of welding wire. It is sufficient for the two parts being welded together to lie flush against each other. Another advantage of laser welding processes is that the laser beam can be divided with simple optical means, so that two parallel welds can be made simultaneously. This is beneficial particularly when the intermediate element is non-rotatably joined to each single nut by a weld. When a component made of steel with a high carbon content is welded to a component made of steel with a low carbon content, zones with a varying carbon content form in the weld.

A further advantage of the laser welding process is that the welding depth can be well controlled, so that both the actual weld and all the surrounding area affected by heat can be kept very narrow. In this way, only a comparatively small amount of heat is passed into the nuts during welding, so there is no fear of deterioration of the rolling element raceways or damage to the rolling element diverting members, which are made of plastic and inserted in the nuts at this final stage of assembly. The quality of the weld may optionally be improved by pre-heating or post-heating the region close to it. Post-heating in particular can prevent the critical cooling speed of the weld from being exceeded. In view of the material of the rolling element diverting members, the upper limit for the temperature to be used in their vicinity during pre-heating and/or welding and/or post-heating is approximately 120° C. Higher temperatures can certainly prevail in spots within regions of the single nuts remote from the diverting members. The screw drive can be put back into use immediately after welding. No idle times or expensive post-treatments are necessary.

However it is basically also possible to use other welding methods, e.g., TIG (tungsten/inert gas) welding or soldering.

Regardless of the welding method used, it is preferable for the welding or seam, of which there is at least one, to be in the form of a V-welding or V-seam in order to obtain a smooth external surface for the double nut. It is further advantageous for the two components being welded together to be chamfered in the region envisaged for welding.

To protect the weldings or seams used to join the two single nuts —with the aid of an intermediate element if so desired —from corrosion or similar noxious external influences, it is proposed, further according to the invention, that these weldings or seams should be covered by means of a covering ring. The ring may be made of plastic, metal or other suitable material and may further be fixed on the screw drive, e.g., by adhesion. If a slotted covering ring is employed, it may easily be clipped onto the screw drive and held to the screw drive solely by the elasticity inherent in the ring.

In all the embodiments discussed above, it is firstly possible for the two single nuts to bear directly on each other in the direction of the axis of the spindle. Alternatively, it is also possible for the two single nuts to bear on each other in the direction of the axis of the spindle by means of the intermediate element.

If at least one fit component is employed both when joining the intermediate element to one single nut and when joining it to the other single nut, it is proposed that all the fit components should be identical. This has advantages in respect of the cost of producing and storing the fit components.

The invention further concerns a method of assembling a screw drive according to the invention, particularly a ball screw drive, wherein, in order to set a desired play or bias, the two single nuts are placed against each other by turning them on the screw spindle and are joined non-rotatably in a relative rotary position corresponding to the desired play or bias and wherein, in order to fix the relative rotary position of the two single nuts, the first of the two single nuts or an intermediate element joined thereto and arranged between the two single nuts, as a first alternative, is welded to the second single nut or to at least one part joined thereto or, as a second alternative, has at least one peripheral section pressed into an associated aperture in the second single nut. The advantages of this method and its possible forms are described above in connection with the discussion of the screw drive according to the invention.

Finally, the invention relates to a method of assembling a screw drive, particularly a ball screw drive, wherein, in order to set a desired play or bias by turning on the screw spindle, the two single nuts are placed against each other and joined non-rotatably in a relative rotary position corresponding to the desired play or bias and wherein, when the desired play or bias has been obtained, a common aperture is cut out of the two single nuts and a fit component is inserted and fixed in the aperture. The invention further concerns a screw drive assembled by this method.

BRIEF DESCRIPTION OF THE DRAWINGS

The invention will now be further explained with reference to some embodiments in the accompanying drawings, in which:

FIG. 2 is a sectional view of the screw drive with rolling elements in section along the line II—II in FIG. 1;

FIGS. 3–7 and 9–13 are views similar to FIG. 2 of further embodiments of screw drives according to the invention;

DETAILED DESCRIPTION

Figure 1:
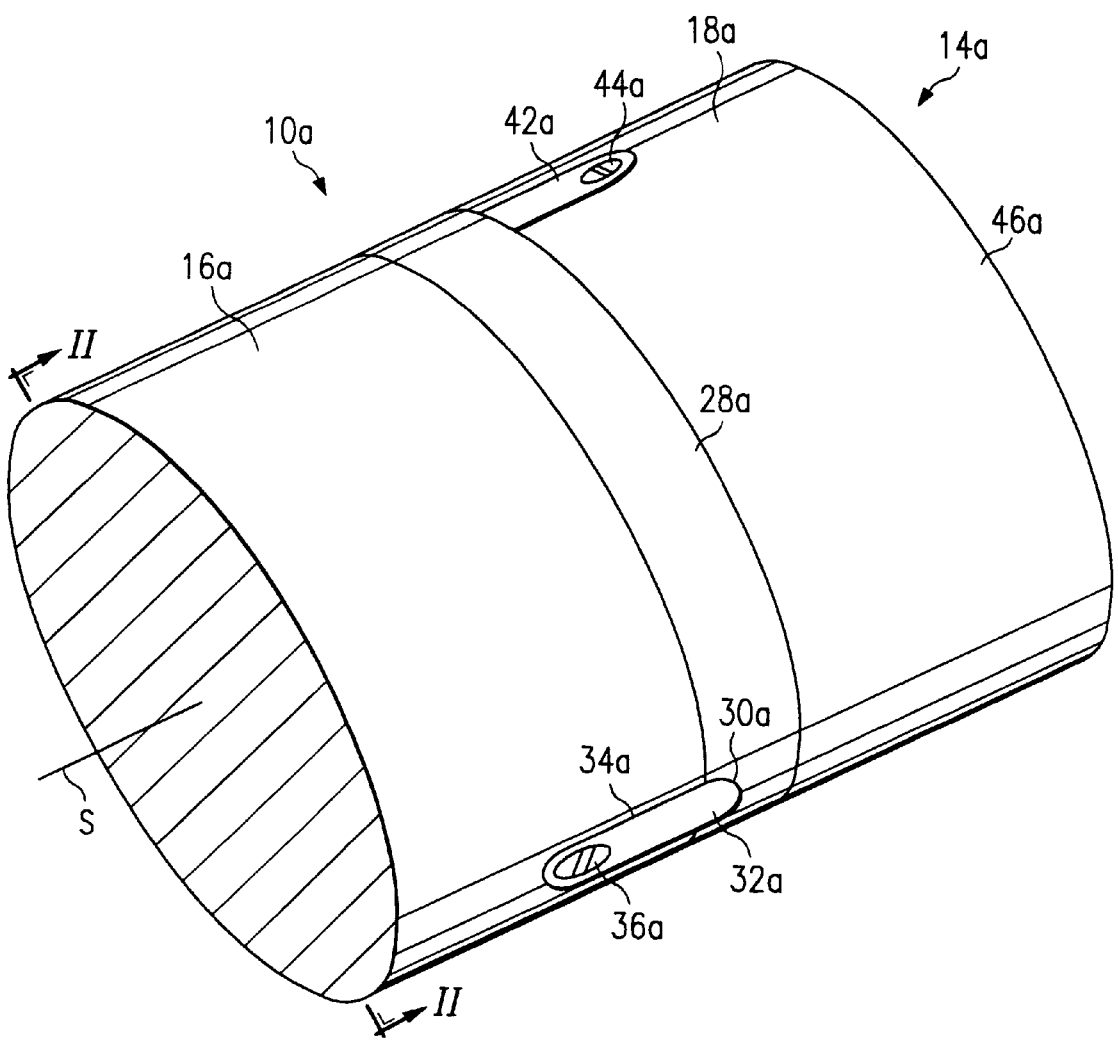
FIG. 1 is a perspective view of a first embodiment of a screw drive with rolling elements according to the invention.

Referring to FIGS. 1 and 2, a screw drive with rolling elements is shown generally at 10a. The screw drive 10a includes a screw spindle 12a (see FIG. 2) with a spindle axis S and a double nut 14a arranged concentrically with the spindle 12a. The double nut 14a comprises a first single nut 16a and a second single nut 18a which are joined together non-rotatably in a manner to be explained below.

Rolling element raceways 20a and 22a in the two nuts 16a and 18a, together with a rolling element raceway 24a in the spindle 12a, form channels for rolling elements 26a. In a conventional manner—and hence not illustrated—the rolling element channels associated with the two nuts 16a and 18a are closed in on themselves by return channels formed in the generated surface of the nuts 16a, 18a, so that the rolling elements associated with the two nuts 16a, 18a—spheres in the embodiment illustrated—revolve endlessly in those channels. In this way, a rotary movement of the spindle 12a about the axis S is converted to a linear movement of the guided double nut 14a in the direction of the axis S.

To this extent, the screw drive 10a according to the invention corresponds to screw drives known from the prior art.

Screw drives of this type are used, for example, for rapid and accurate positioning of tool and work holders and for moving them at defined speeds. In order to satisfy the highest possible accuracy requirements when the direction of movement of the double nut 14a is reversed, the double nut 14a must run on the spindle 12a as far as possible without play. For this purpose, when the two nuts 16a and 18a are mounted on the spindle 12a they are rotated far enough towards each other to bring them into contact. If the nuts 16a and 18a are rotated further relative to each other, this causes the rolling elements 26a in the raceways 20a and 22a to be brought into contact with opposing side surfaces of the respective raceways 20a and 22a. As a result, the two nuts 16a and 18a are biased relative to the screw spindle 12a. Owing to this action of the rolling elements 26a on different side surfaces of the raceways 20a and 22a, the play between the double nut 14a and the spindle 12a is reduced if not completely eliminated. To prevent the bias described above from being removed by relative rotation of the two nuts 16a, 18a, the nuts are held non-rotatably together, namely by using an intermediate member 28a as is also known from prior art.

The present invention involves the manner of constructing the intermediate element and the way in which it is non-rotatably joined to the two single nuts.

In the embodiment in FIGS. 1 and 2, the intermediate element is in the form of an intermediate ring 28a. The side of the ring 28a facing towards the nut 16a contains an aperture 30a into which a fit component 32a engages positively. (See FIG. 1) The fit component 32a is in turn received positively in a recess 34a in the nut 16a and fixed to the nut by means of a screw bolt 36a. A fit component 42a is similarly received positively in a recess 40a in the second nut 18a and held in the aperture 40a by means of a screw bolt 44a. Unlike the fit component 32a, the additional fit component 42a ends flush with the end surface of the nut 18a facing towards the intermediate ring 28a.

If the two nuts 16a and 18a are turned towards each other during the mounting of the screw drive 10a until they are in contact by means of the intermediate ring 28a, the fit component 42a also comes into contact with the ring 28a in the process. If the desired play or bias of the two nuts 16a, 18a relative to the spindle 12a is obtained through relative rotation of the two nuts, the fit component 42a and intermediate ring 28a are welded together along their line of contact 46a, and the relative rotary position of the two nuts 16a and 18a corresponding to the desired bias or play is thus secured.

In order to make the weld 46a, it is preferable for both the intermediate ring 28a and the fit component 42a to be made of a weldable material, e.g., steel with a low carbon content. The limit for the weldability of steel without pre- or post-treatment is usually given in the technical literature as a carbon content of 0.22%. In the embodiment in FIGS. 1 and 2, on the other hand, the two nuts 16a and 18a may be made of hard steel, i.e., a steel with a high carbon content.

The embodiment shown in FIGS. 1 and 2 may be dismantled undamaged on the screw spindle 12a and reassembled after servicing or repair. All that has to be done is to release the screw 36a then remove the fit component 32a from the recess 34a. The component 32a is consequently no longer in positive engagement with the ring 28a, so the nut 16a can be removed from the unit formed by the ring 28a and the second nut 18a by rotating it about the spindle axis S. To reassemble the screw drive 10a, the above steps are carried out in the reverse order. To facilitate dismantling of the fit component 32a, the hole 48a passing through it is provided with internal thread larger than the external thread on the screw bolt 36a. When the screw 36a has been removed, a larger-diameter screw can be driven into the thread 48a; this screw then bears on the nut 16a and levers the fit component 32a out of the aperture 34a.

It should also be mentioned that the intermediate ring 28a is held concentrically with the axis S of the spindle, both on a centering attachment 50a of the nut 16a and on a centering attachment 51a of the nut 18a. The ring 28a is held with a loose centering fit, i.e., a fit which facilitates relative rotation of the nuts 16a, 18a and intermediate ring 28a. This is shown diagrammatically at detail A in FIG. 2.

FIG. 3 shows a further embodiment of a screw drive with rolling elements according to the invention, which differs from the embodiment in FIGS. 1 and 2 only in the way that the intermediate ring is non-rotatably fixed to the first nut. Similar parts in FIG. 3 therefore carry the same references as in FIGS. 1 and 2 but with the suffix "b" instead of the suffix "a". Moreover, the FIG. 3 embodiment will be described below only insofar as it differs from the embodiment in FIGS. 1 and 2.

In the screw drive 10b in FIG. 3, the intermediate ring 28b is fixed non-rotatably on the centering attachment 50b of the first nut 16b with a press fit, as shown diagrammatically at detail B in FIG. 3. Such a press fit can be obtained, e.g., by cooling the nut 16b and heating the intermediate ring 28b, placing the thermally expanded ring 28b on the centering attachment 50b of the thermally contracted nut 16b then equalising the temperature of the two parts, in other words by thermally "shrinking" the ring 28b onto the nut 16b.

The second nut 18b may be fixed to the intermediate ring 28b in the way described above for the embodiment in FIGS. 1 and 2. For this reason, FIG. 3 also shows only the lower half of the screw drive 10b.

The FIG. 3 embodiment cannot be dismantled undamaged on the screw spindle, as the first nut 16b cannot be turned relative to the intermediate ring 28b fixed to the second nut 18b owing to the press fit. In order to dismantle the screw drive 10b on the spindle, the fit component corresponding to the fit component 42a must be levered out of the associated aperture in the second nut 18b with the intermediate ring 28b, breaking the weld. To facilitate the levering out process, the hole passing through the fit component 42a has internal thread 52a, which is shaped and may be used in the same way as described for the internal thread 48a of the fit component 32a, as illustrated for the FIG. 2 embodiment. When the weld has been broken the unit formed by the first nut 16b and the intermediate ring 28b can be removed by relative rotation.

Alternatively, it is possible for the double nut 14b to be driven from the screw spindle onto a plain auxiliary spindle of smaller diameter and then—when the screw bolt corresponding to the screw bolt 44a has been released—for the second nut 18b to be removed in an axial direction from the unit formed by the first nut 16b and the intermediate ring 28b. The weld is not broken in the process, and once the double nut 14b has been remounted on the plain auxiliary spindle it can be returned to the screw spindle.

Another way of joining the intermediate element to the first nut is illustrated in FIG. 4. The FIG. 4 embodiment substantially corresponds to the embodiments in FIGS. 1 to 3. Similar parts therefore carry the same references as in the previous figures but with the suffix "c". Moreover, the FIG. 4 embodiment is only described below insofar as it differs from those in the previous figures.

As shown particularly at detail C, the intermediate ring 28c is screwed onto the attachment 50c of the first nut 16c by means of fine thread 54c. The fine thread 54c differs in pitch and/or screwing direction from the rolling element raceways 20c and 22c of the nuts 16c and 18c. Hence the connection between the ring 28c and the first nut 16c cannot be released in operation. Reference is made to the FIG. 3 embodiment for the assembling and dismantling of the double nut 14c of the screw drive 10c shown in FIG. 4.

Owing to the inherent properties of screw thread, the attachment 50c of the first nut 16c in the FIG. 4 embodiment cannot be used as an attachment for centering the intermediate ring 28c. To obtain a centering action all the same, an additional centering section, which springs back radially of the axis S of the spindle relative to the threaded section, might be provided on the attachment 50c, e.g., in addition to the threaded section shown in FIG. 4.

FIG. 5 shows a further embodiment of a screw drive with rolling elements according to the invention substantially corresponding to the embodiments described above. Similar parts in FIG. 5 therefore carry the same references as in the preceding figures but with the suffix "d". Moreover the FIG.

5 embodiment will only be described below insofar as it differs from the preceding embodiments.

In the screw drive 10d in FIG. 5, the intermediate ring 28d is integral with the first nut 16d, thereby reducing the number of parts required for the screw drive 10d. With regard to the joining of the second nut 18d to the first nut 16d or its intermediate ring section 28d, reference is made to the description of the FIG. 2 embodiment. As in that embodiment, a fit component 42d held to the nut 18d by means of a screw bolt 44d is joined to the intermediate ring section 28d of the first nut 16d by a weld 46d. As in the FIG. 2 embodiment, both nuts 16d and 18d may be made of hard steel, i.e., steel with a high carbon content, if only the fit component 42d is made of a weldable material, particularly a steel with a low carbon content. However, it is equally possible for the first nut 16d to be case hardened.

The double nut 14d of the screw drive 10 d may be dismantled both on the screw spindle and on a plain auxiliary spindle simply by breaking the weld 46d. Reference is made to the discussion of this process in the FIG. 2 embodiment, not least in connection with the shape of the hole 52d passing through the fit component 42d.

FIG. 6 shows a further embodiment of a screw drive with rolling elements according to the invention substantially corresponding to the embodiments described above. Similar parts in FIG. 6 therefore carry the same references as in the preceding figures but with the suffix "e". Moreover, the FIG. 6 embodiment will only be described below insofar as it differs from the preceding embodiments.

The double nut 14e of the screw drive 10e in FIG. 6 has the advantage, particularly over the FIG. 5 embodiment, that a minimum of parts is required for its assembly, namely only the two nuts 16e and 18e. As in the FIG. 5 embodiment the first nut 16e has an integral intermediate ring section 28e. This is joined to the second nut 18e by means of a weld 46e. For this purpose at least one of the two nuts 16e and 18e must be case hardened. The double nut 14e of the screw drive 10e in FIG. 6 can only be dismantled by costly removal of the weld 46e. However it is suitable particularly for applications with a low risk of damage owing to its cost-effective production and assembly.

Figure 7:
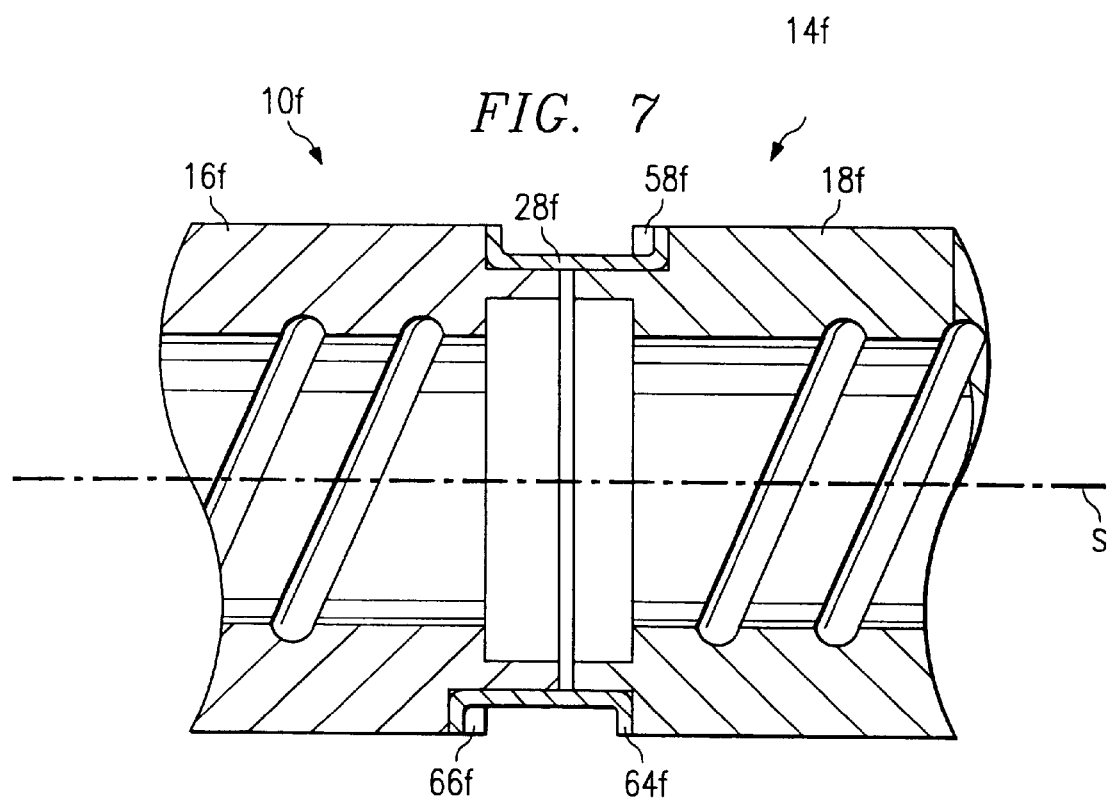
Figure 8:
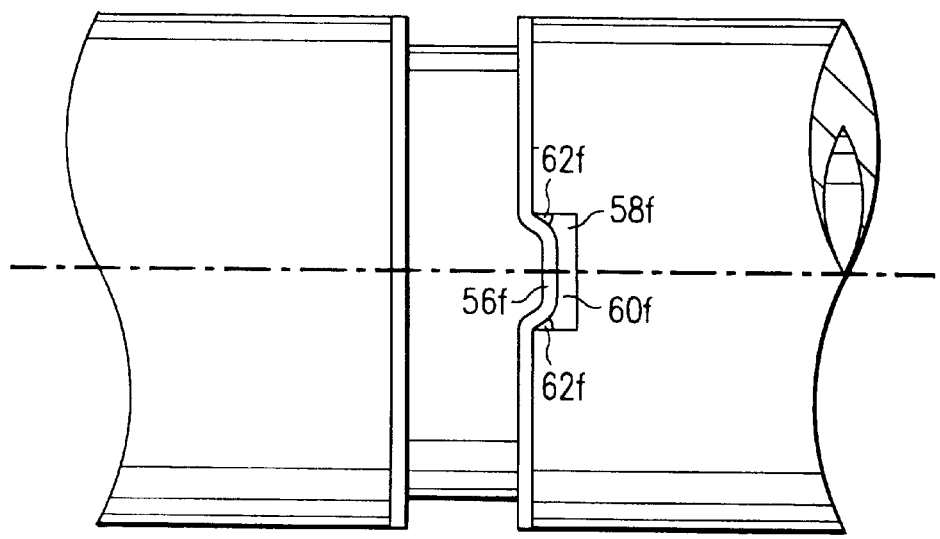
FIG. 8 is a plan view of the FIG. 7 screw drive.

FIGS. 7 and 8 show a further embodiment of a screw drive with rolling elements according to the invention substantially corresponding to the embodiments described above. Similar parts in FIGS. 7 and 8 therefore carry the same references as in the preceding figures but with the suffix "f". Moreover, the embodiment in FIGS. 7 and 8 will only be described below insofar as it differs from the preceding embodiments.

The main difference between the double nut 14f of the screw drive 10 f in FIG. 7 and the previous embodiments is that the intermediate ring 28f joined to the first nut 16f is—after adjustment of the desired play or bias—joined to the second nut 18f or a part attached to it not by welding but by impressing or mortising a peripheral section 56f (see FIG. 8) of the intermediate ring 28f into an aperture 58f in the second nut 18f. The section 56f of the ring 58f may be impressed with the aid of appropriate supporting means and a plunger.

To prevent the biasing force of the two nuts 16f and 18f relative to the screw spindle from being affected by this kind of non-rotating connection between the intermediate ring 28f and the second nut 18f, the peripheral section 56f preferably bears not on the axial boundary surface 60f of the aperture 58f but only on the peripheral boundary surfaces 62f thereof (see FIG. 8). If necessary, the mortised or impressed peripheral section 56f may also be indented in locations corresponding to the peripheral boundary surfaces 62f, although this is not shown in either FIG. 7 or FIG. 8.

In the FIG. 7 embodiment, the intermediate ring 28f is additionally joined positively to the first nut 16f by mortising a peripheral section 64f into a recess 66f in the first nut. But it is basically also possible to resort to joining the intermediate ring 28f to the first nut 16f by a different method, e.g. one of the methods described in connection with FIGS. 2 to 4.

Figure 9:
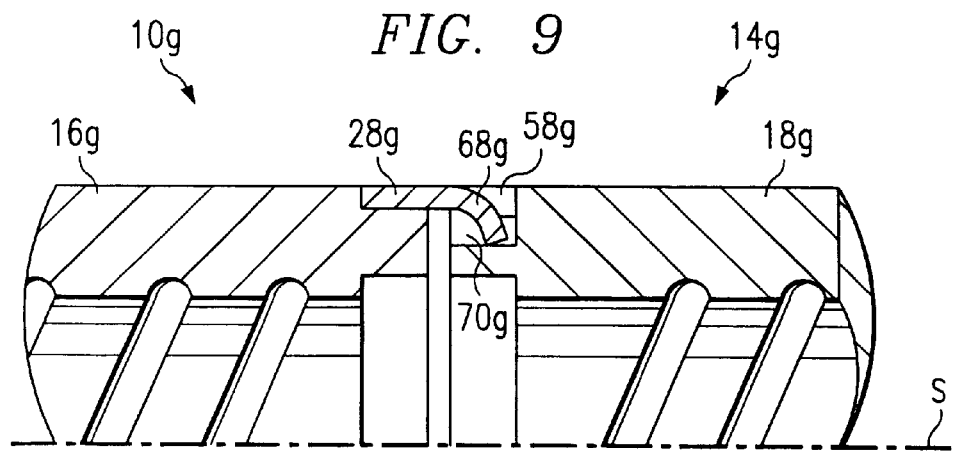

FIG. 9 shows a further embodiment of a screw drive with rolling elements according to the invention substantially corresponding to the embodiments described above. Similar parts in FIG. 9 therefore carry the same references as in the preceding figures but with the suffix "g". Moreover the FIG. 9 embodiment will only be described below insofar as it differs from the preceding embodiments.

The double nut 14g of the screw drive 10g in FIG. 9 differs from the embodiment illustrated in FIGS. 7 and 8 only in the feature that the peripheral section 68g of the intermediate ring 28g is joined to the aperture 58g of the second nut 18g by pressing it into the aperture not in an axial direction, i.e., in the direction of the axis S of the spindle, but in a radial direction, i.e., towards the axis S. To prevent this connection from affecting the centering of the two nuts 16g and 18g relative to the axis S of the spindle, the peripheral section 68g pressed in should bear not on the radial boundary surface 70g of the aperture 58g but only on its peripheral boundary surfaces. An effect on centering can be reliably excluded if the two nuts 16g and 18g interengage with a centering attachment and a centering aperture; however this is not illustrated in FIG. 9.

Figure 10:
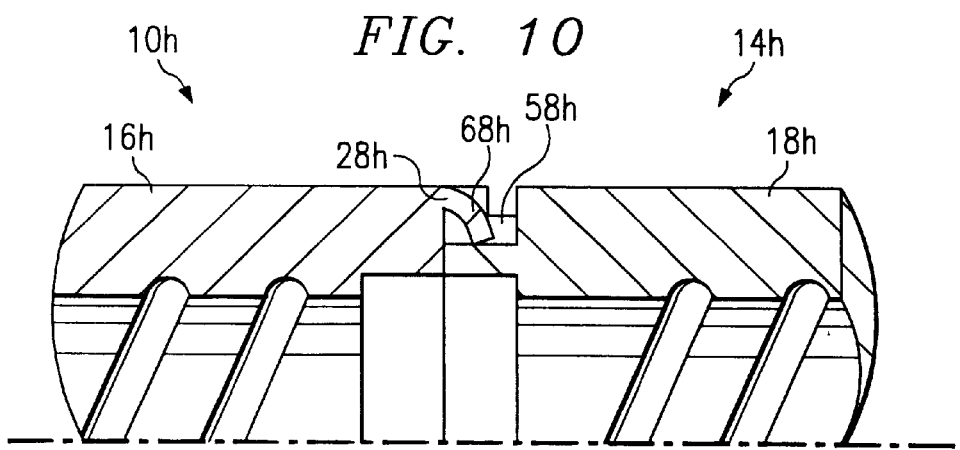

FIG. 10 shows a further embodiment of a screw drive with rolling elements according to the invention substantially corresponding to the embodiments described above. Similar parts in FIG. 10 therefore carry the same references as in the preceding figures but with the suffix "h". Moreover the FIG. 10 embodiment will only be described below insofar as it differs from the preceding embodiments.

In the double nut 14h of the screw drive 10h in FIG. 10, an intermediate ring section 28h is moulded integrally onto the first nut 16h. The two nuts 16h and 18h are joined non-rotatably by pressing a peripheral section 68h into an aperture in the second nut 18h in the same way as in the FIG. 9 embodiment. In this case, the nut 16h is preferably case hardened and made of a steel with a low carbon content, that is to say, a soft, relatively easily deformable steel, particularly in the region of the intermediate ring section 28h.

In connection with the embodiments in FIGS. 7 to 10, it should be added that the apertures into which the peripheral sections of the intermediate ring are pressed in an axial or radial direction advantageously do not continue to the inner peripheral surface of the nuts, so that weakening of the end region of the nuts is avoided and their adequate rigidity thus ensured.

Figure 11:
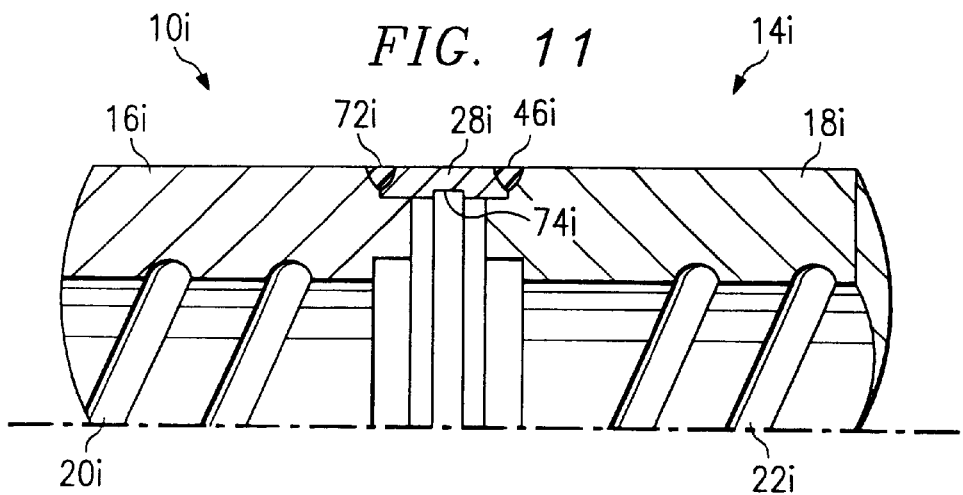

FIG. 11 shows a further embodiment of a screw drive with rolling elements according to the invention substantially corresponding to the embodiments described above. Similar parts in FIG. 11 therefore carry the same references as in the preceding figures but with the suffix "i". Moreover the FIG. 11 embodiment will only be described below insofar as it differs from the preceding embodiments.

In the double nut 14i of the screw drive 10i in FIG. 11, the two nuts 16i and 18i are prevented from twisting against each other by an intermediate ring 28i, which is joined to the second nut 18i by a weld 46i and to the nut 16i by a weld 72*i*. If the ring 28*i* is made of a steel with a low carbon content, both nuts 16*i* and 18*i* may be made of a hard steel, i.e., a steel containing a high proportion of carbon.

A laser welding plant may, for example, be used to form the two welds 46*i* and 72*i*. In a plant of this type the laser beam may be divided using simple optical means, so that the two parallel seams 46*i* and 71*i* can be made simultaneously. This shortens the production time, with a beneficial effect on manufacturing costs.

It should further be pointed out that the intermediate ring 28*i* is weakened by a groove 74*i* in its central region. This makes the ring 28*i* slightly flexible, so that the double nut 14*i* can yield to any inaccuracies of pitch or parallelism present in the raceways 20*i* and 22*i* of the nuts 16*i* and 18*i* with suitable compensating movements. This flexibility is important especially for low cost embodiments which are made with relatively generous manufacturing tolerances. The embodiments described above, where at least one fit component is used for the joint between the first nut and the intermediate ring or/and the joint between the ring and the second nut, need not be made flexible in this way as "fit component joints" are flexible enough already.

Figure 12:
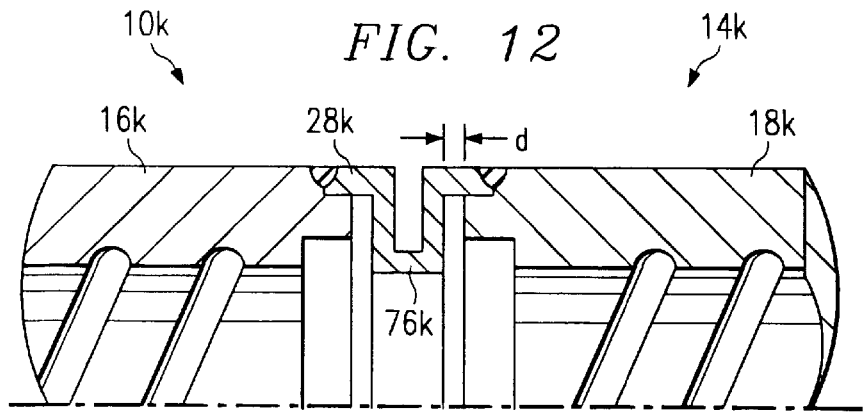

FIG. 12 shows a further embodiment of a screw drive with rolling elements according to the invention substantially corresponding to the embodiments described above. Similar parts in FIG. 12 therefore carry the same references as in the preceding figures but with the suffix "k". Moreover the FIG. 12 embodiment will only be described below insofar as it differs from the preceding embodiments.

The double nut 14*k* of the screw drive 10*k* in FIG. 12 differs from the FIG. 11 embodiment only in the fact that the intermediate ring 28*k* is made flexible not by weakening the material but by appropriate shaping. In the FIG. 12 embodiment, the ring 28*k* has a "hat-shaped" cross-section. Another important factor in making the double nut 14*k* flexible is that the two sides 76*k* of the ring 28*k* extending in a radial direction should be at a certain distance d from the end faces of the two nuts 16*k*, 18*k* directed towards them. Otherwise, the FIG. 12 embodiment is the same as that in FIG. 11, particularly as far as the welding of the ring 28*k* onto the nuts 16*k* and 18*k* is concerned.

Figure 13:
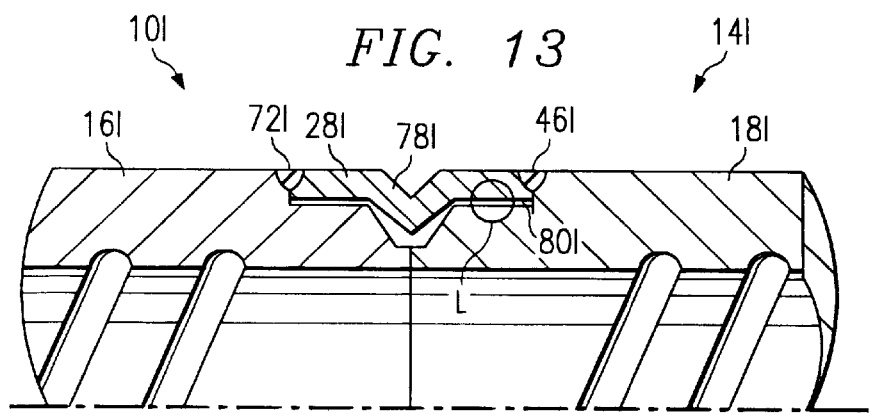

FIG. 13 shows a further embodiment of a screw drive with rolling elements according to the invention substantially corresponding to the embodiments described above. Similar parts in FIG. 13 therefore carry the same references as in the preceding figures but with the suffix "l". Moreover the FIG. 13 embodiment will only be described below insofar as it differs from the preceding embodiments.

In the FIG. 13 embodiment, the intermediate ring 28*l* is made flexible by a V-shaped section 78*l* and joined to the two single nuts 16*l* and 18*l* of the double nut 14*l* of the screw 10*l* by welds 46*l* and 72*l*. In contrast with the embodiments in FIGS. 11 and 12, in the FIG. 13 embodiment the two nuts 16*l* and 18*l* have their end faces in contact with each other, and thus bear on each other rather than on the ring 28*l*.

Although the intermediate ring in the foregoing embodiments is described as a non-slit, circular cylindrical element, i.e., an element with a continuous surface line, it is also possible according to the invention for the intermediate element to be made of a sheet metal strip placed around the contact point between the two nuts. In "slotted ring" embodiments of this type, the non-rotating joint between the intermediate element and the two nuts may be secured, for example, by a double-sided adhesive tape, as shown, for example, at detail L in the FIG. 13 embodiment. The adhesive tape 80*l* may for example be a double-sided strip with curing resins.

Figure 14:
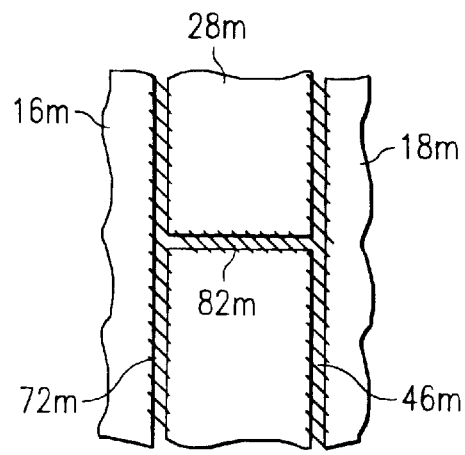
FIGS. 14 and 15 are plan views illustrating various methods of joining an intermediate element in the form of a slotted ring element with the two single nuts.

As illustrated in FIG. 14, in order to protect the adhesion points from external influences, all of the joints between a slotted intermediate ring 28*m* and the two nuts 16*m* and 18*m* may be sealed by welds 46*m*, 72*m* and 82*m*. The maximum width of the joints is preferably 0.2 times the material thickness of the sheet metal strip 28*m*. The welds 46*m*, 72*m* and 82*m* may be made as described above, by laser welding, TIG welding or similar welding processes. Thus, they may for example be in the form of roll welds. Other pressure welding processes may also be used.

Figure 15:
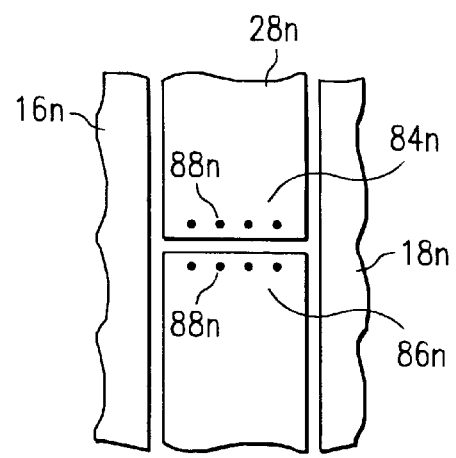

If harmful external influences are not to be feared, the slotted ring 28*n* may be fixed to the nuts 16*n* and 18*n* by spot welding points 88*n* which penetrate the adhesive layer or adhesive tape at its opposing ends 84*n* and 86*n*, as shown in FIG. 15.

Figure 16:
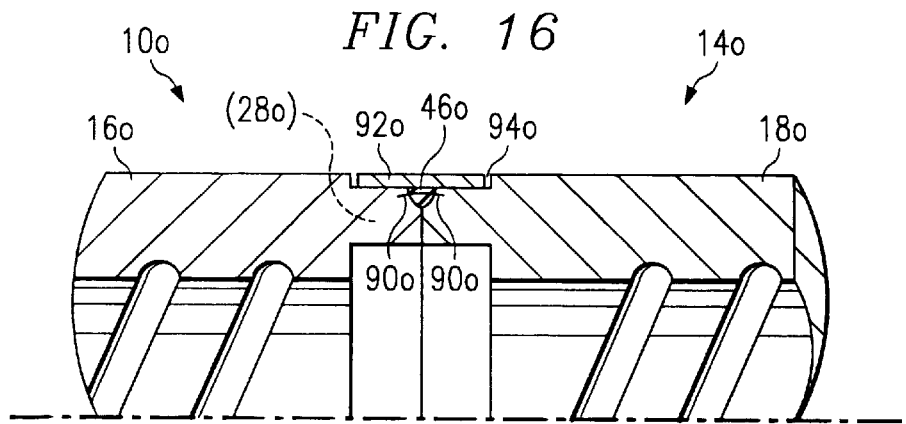
FIG. 16 is another view similar to FIG. 2 of a further screw drive with rolling elements according to the invention.

FIG. 16 shows a further embodiment of a screw with rolling elements according to the invention substantially corresponding to the embodiments described above. Similar parts in FIG. 16 therefore carry the same references as in the preceding figures but with the suffix "o". Moreover the FIG. 16 embodiment will only be described below insofar as it differs from the preceding embodiments.

As in the FIG. 6 embodiment, only a small number of parts are required to make the double nut 14*o* of the screw 10*o* as the two single nuts 16*o* and 18*o* are welded directly together. As previously stated, at least one (16*o* or 18*o*) of the two single nuts has to be made of a low-carbon steel in a region adjoining the weld 46*o* for this purpose. The weld 46*o* is preferably V-shaped, as this enables a smooth external surface to be obtained for the double nut 14*o*. To facilitate the formation of the V-shaped weld the unwelded single nuts 16*o* and 18*o* are each shaped with a chamfer 90*o* at the edges intended for welding.

In order to protect the weld 46*o* from corrosion or other harmful external influences, it is covered with a ring 92*o*. To give the whole double nut 14*o* a substantially continuous smooth surface, the ring 92*o* is inserted in an annular recess 94*o* formed jointly by the two single nuts 16*o* and 18*o*. The covering ring 92*o* may be made of metal, plastic or other suitable material. It is preferably made as a slotted ring to facilitate its insertion in the recess 94*o*. The ring 92*o* may be fixed in the recess 94*o* by adhesion or the like. Alternatively it may be held in the recess 94*o* solely by its inherent elasticity. Here, it should be pointed out again with reference to the embodiments in FIGS. 6 and 16 that it is often difficult to determine whether the two single nuts are joined directly or by an intermediate element integral with one of them. Thus in the FIG. 6 embodiment the region 28*e* may with some justification be regarded as part of the single nut 16*e*, so that one could speak of a direct connection between the two single nuts 16*e* and 18*e*. Conversely, in the FIG. 16 embodiment a region 28*o* which fulfils the function of the intermediate element could be defined on one of the two single nuts.

Figure 17:
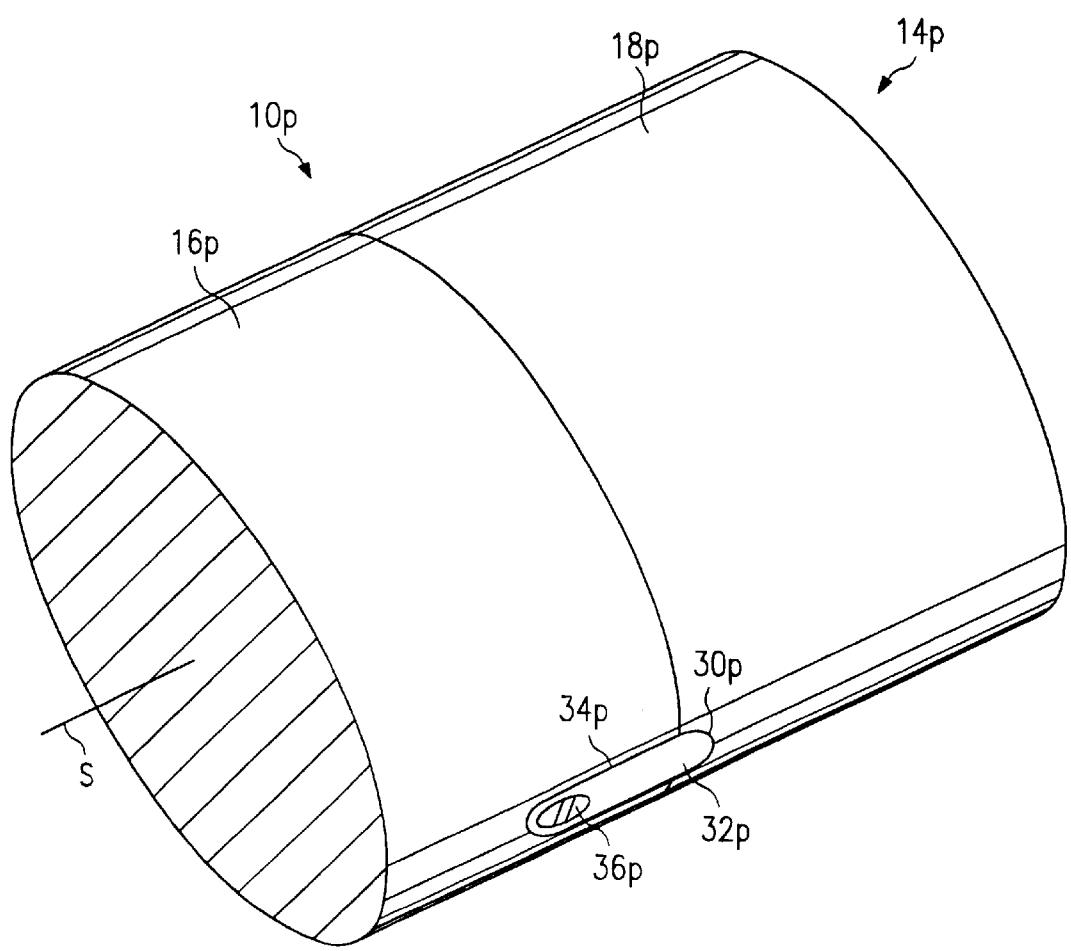
FIG. 17 is another view similar to FIG. 1 of a further screw drive with rolling elements according to the invention.

FIG. 17 shows a further embodiment of a screw with rolling elements according to the invention substantially corresponding to the embodiments described above. Similar parts in FIG. 17 therefore carry the same references as in the preceding figures but with the suffix "p". Moreover, the FIG. 17 embodiment will only be described below insofar as it differs from the preceding embodiments.

In the FIG. 17 embodiment, the two single nuts 16*p* and 18*p* are first screwed towards each other on the screw spindle (axis S) until the desired play or bias is obtained, in order to form the double nut 14p of the screw 10p. With the nuts held in that state, a common aperture 30p/34p is cut in the region of the contact plane of the two single nuts 16p and 18p. That is to say, a first part-aperture 34p cut into the peripheral surface of the single nut 16p merges into a second part-aperture 30p cut into the peripheral surface of the single nut 18p. A substantially level, flat fit component 32p is inserted and fixed in the aperture 30p/34p. As shown in FIG. 17, the fit component 32p is fixed to the single nut 16p by means of a screw 36p. The screw 36p engages in a threaded bore which is formed in the single nut 16p after the cutting of the aperture 30p/34p. The fit component 32p may additionally be screwed to the second part-aperture. The fit component 32p may additionally or alternatively be adhered to at least one of the part-apertures 30p/34p.

Although the invention has been described herein by reference to specific embodiments thereof, it will be understood that such embodiments are susceptible of modification and variation without departing from the invention concepts disclosed. All such modifications and variations, therefore, are intended to be included within the spirit and scope of the appended claims.

What is claimed is:

1. A screw drive with rolling elements, comprising:
   a screw spindle with a spindle axis;
   a double nut running on the screw spindle with two separately formed single nuts which are substantially rigidly joined in the direction of the axis of the spindle, said two single nuts being rotatable continuously about the spindle axis relative to each other and fixed in any relative rotary position corresponding to a desired bias relative to the screw spindle;
   an intermediate element joined to the first single nut and arranged between the two single nuts; and
   at least one part joined to the second single nut, the intermediate element being welded to the at least one part after the bias of the two single nuts has been adjusted to the desired setting by relative rotation of the first and second single nuts about the spindle axis.

2. A screw drive according to claim 1, wherein said at least one part comprises at least one fit component detachably fixed to the second single nut, the intermediate element being welded to said at least one fit component.

3. A screw drive according to claim 2, wherein said at least one fit component is detachably fixed to said second single nut by a screw bolt passing through a hole in said fit component.

4. A screw drive according to claim 3, wherein the inside diameter of the hole passing through the fit component is larger than the outside diameter of the screw bolt, and wherein the hole passing through the fit component is provided with internal screw thread.

5. A screw drive according to claim 2, wherein the fit component lies substantially flush against the intermediate element along a predetermined distance.

6. A screw drive according to claim 5, wherein the fit component is welded to the intermediate element along said entire predetermined distance.

7. A screw drive according to claim 1, wherein the intermediate element is an element separate from the first single nut.

8. A screw drive according to claim 7, wherein at least one additional fit component is joined to one of the first single nut and the intermediate element and is in engagement with an aperture provided in the other of the first single nut and the intermediate element, and the intermediate element is held non-rotatably relative to the first single nut by said at least one additional fit component.

9. A screw drive according to claim 8, wherein the additional fit component is in the form of a separate component and is detachably fixed to the first single nut.

10. A screw drive according to claim 9, wherein the additional fit component is detachably fixed to the first single nut by a screw bolt passing through a hole in the additional fit component having an inside diameter larger than the outside diameter of the screw bolt, and wherein said hole is provided with internal screw thread.

11. A screw drive according to claim 1, wherein the intermediate element is arranged centered in respect of the axis of the spindle.

12. A screw drive according to claim 1, wherein the intermediate element is formed by a closed ring member.

13. A screw drive according to claim 1, wherein the two single nuts bear on each other in the direction of the axis of the spindle by means of the intermediate element.

14. A method of assembling a screw drive according to claim 1, wherein:
   (a) in order to set a desired bias, the two single nuts are placed against each other by turning them on the screw spindle and are joined non-rotatably in a relative rotary position corresponding to the desired bias; and
   (b) in order to fix the relative rotary position of the two single nuts, the intermediate element is welded to the at least one part after the bias is set in accordance with step (a).

15. A screw drive with rolling elements, comprising:
   a screw spindle with a spindle axis;
   a double nut running on the screw spindle with two separately formed single nuts which are substantially rigidly joined in the direction of the axis of the spindle, said two single nuts being rotatable continuously about the spindle axis relative to each other and fixed in any relative rotary position corresponding to a desired bias relative to the screw spindle;
   one of two components to be joined, said components including (i) the first single nut and an intermediate element or (ii) the intermediate element and the second single nut, being made of non-hardened steel at least in a region intended for joining to the respective other component; and
   said two components to be joined being joined by welding in said region of non-hardened steel intended for joining after the bias of the two single nuts has been set.

* * * * *